A. G. DAMM.
APPARATUS FOR REGULATING AUTOMATICALLY THE CUTTING OF HOLES IN JACQUARD CARDS.
APPLICATION FILED JUNE 24, 1918
1,293,356.
Patented Feb. 4, 1919.
2 SHEETS—SHEET 1.
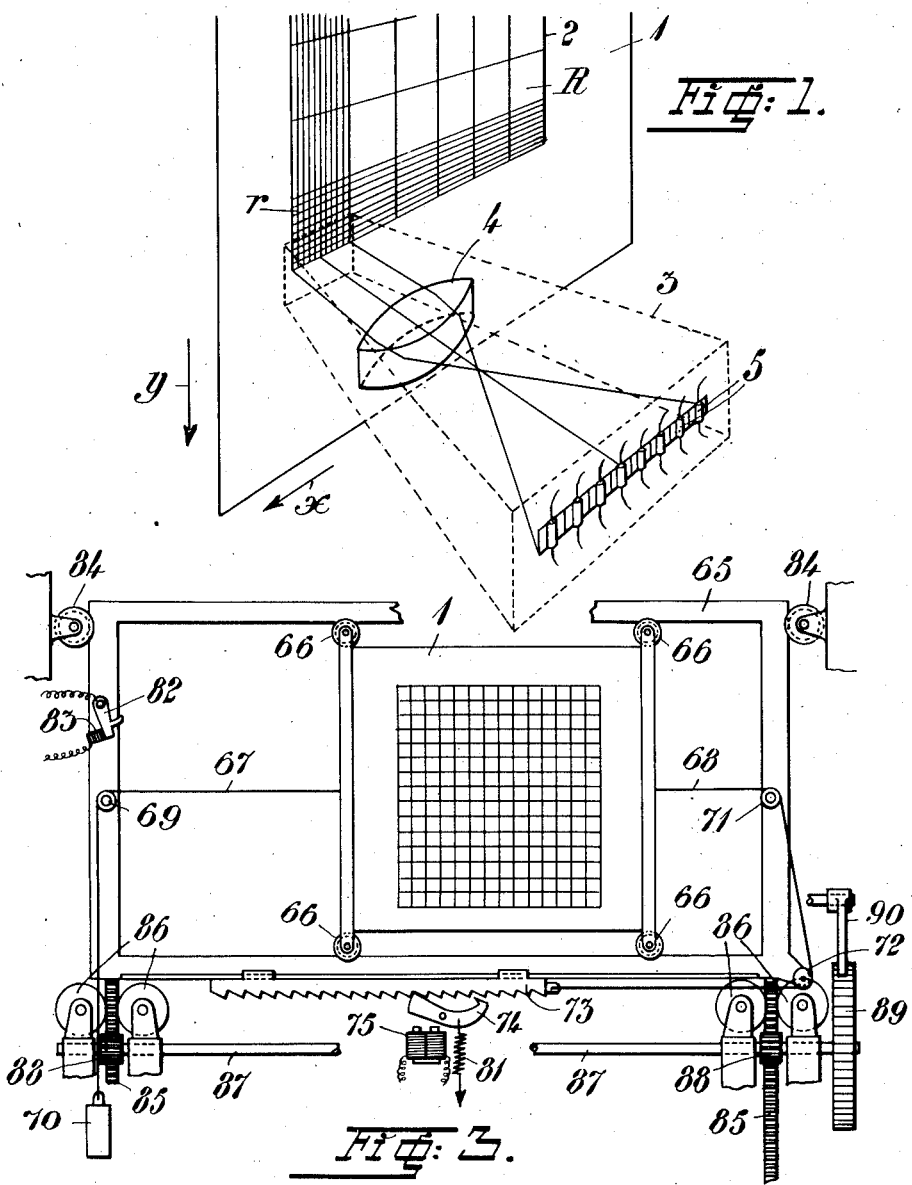

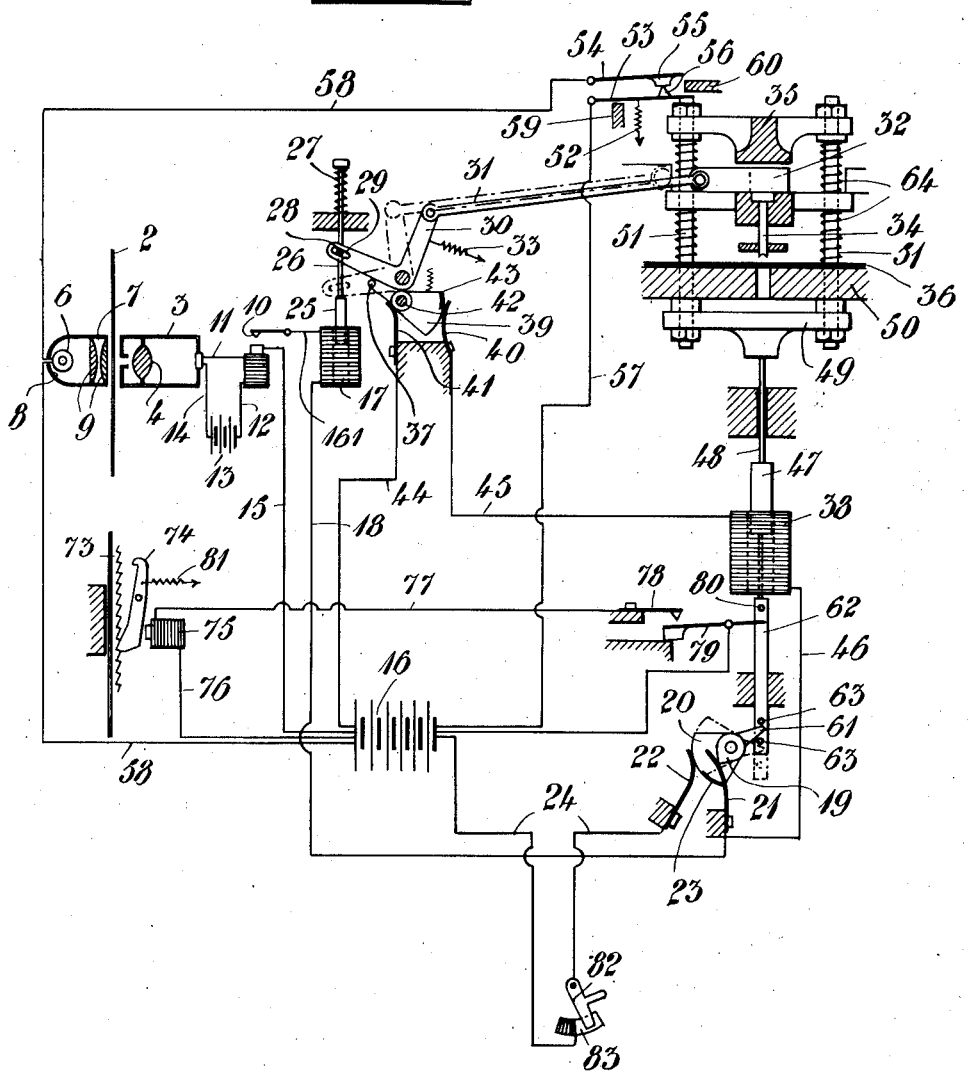

UNITED STATES PATENT OFFICE.

ARVID GERHARD DAMM, OF RÖNNINGE, SWEDEN.

APPARATUS FOR REGULATING AUTOMATICALLY THE CUTTING OF HOLES IN JACQUARD-CARDS.

1,293,356.          Specification of Letters Patent.      Patented Feb. 4, 1919.

Application filed June 24, 1918. Serial No. 241,677.

*To all whom it may concern:*

Be it known that I, ARVID GERHARD DAMM, a citizen of the Kingdom of Sweden, residing at Rönninge, Sweden, have invented new and useful Improvements in Apparatus for Regulating Automatically the Cutting of the Holes in Jacquard-Cards, of which the following is a specification.

This invention relates to a method of and an apparatus for regulating automatically the cutting of the holes in jacquard cards according to various designs for textile purposes.

The principle of this invention is as follows: A textile design, executed with an opaque color on a transparent paper is at regular intervals moved between a source of light and a camera containing cells of selenium, the arrangement being such, that rays passing through the transparent, i. e., non-colored parts of the design will reach certain of said cells, each of which is inserted in an electric circuit comprising a relay, actuated when a sufficiently strong light falls on the corresponding cell of selenium, and then in its turn closing an electric circuit passing through and actuating an electromagnetic member arranged to determine the position of one of the bolts regulating the action of the punches of an ordinary card-cutting machine.

A preferred embodiment of the invention is illustrated in the accompanying drawings, in which—

Figure 1 is a perspective view of a camera and a designing paper. Fig. 2 shows a system of devices for regulating automatically a card-punching machine. Fig. 3 shows an arrangement for advancing the design conformably to the punching process.

Referring to Fig. 1, 1 is a screen made out of glass or some other transparent material and movable in horizontal and vertical directions $x$ and $y$ respectively, the screen serving to support a textile design 2, executed in opaque color on a transparent paper, in such a position as to make the rectangular limits of the design and the direction of movement of screen 1 exactly to coincide. Supposing the design 2 to be executed on square-ruled paper, as shown in Fig. 1, a certain number of small squares $r$ will be united into bigger divisions or squares R, these containing, in each horizontal row, the same number, in the present instance supposed to be eight, of small squares $r$, as the jacquard machine used has needles in each transverse row, said number being equal to the number of holes that may be cut in a transverse row of the jacquard card. Some of these small squares $r$ may be filled out by an opaque color, for instance, lamp black, according to an arbitrary textile design. A camera 3, the front aperture of which is of exactly the same size and form as the series of small squares $r$ to be reproduced on one row of the jaquard card, is placed immediately in front of the design 2 illuminated from behind by a strong source of light, rays from which will penetrate into the camera only if passing through non-colored squares $r$ of the design. Inside the camera these rays pass through a lens 4, which may be either spherical or, as shown in Fig. 1, double-cylindrical, i. e., bounded by two plane and two curved surfaces. The lens is constructed and placed so as to project an image of the transparent squares $r$ in question, suitably enlarged, on the opposite wall of the camera. In the space where this image falls, a series of cells of selenium 5 are placed in a horizontal row, the cells being the same in number as the squares to be reproduced at a time. Some of the cells will be illuminated, other ones not, according to the design. It being a property of the metal selenium to oppose a diminished resistance to an electric current when illuminated, the cells may, as will be shown farther on, be used to regulate successively the working of a card-punching device according to successive projections of different parts of the design.

In Fig. 2 numeral 6 designates a source of light, for instance, an incandescent electric lamp, placed within a box 7, suitably provided with arrangements for instance, reflectors 8 and lenses 9, for concentrating the rays of light on that part of the design which is to be reproduced. The rays passing through transparent parts of the design 2, penetrating into the camera 3 and passing the lens 4, will influence the conductive properties of one or more of the cells of selenium, these being of course suitably protected from all other rays of light. By an electric conductor 14 each cell is connected to one pole of a battery or other source of electricity 13, the other pole of which is connected by a conductor 12 to one end of the windings of a relay 10, the other end of said windings being connected to the cell in such a way, that the electric current must pass through that part of the cell which is exposed to the light.

The tension and energy of current is such as to actuate the relay 10 only when the cell is made conductive by being illuminated by rays passing through a non-colored square of the design 2. One contact of the relay 10 is connected by a conductor 15 to one pole of a source of electric energy 16, the other contact of the relay being connected by a conductor 161 to one end of the windings of a solenoid 17, the other end of said windings being connected by a conductor 18 to an interrupter. In the present instance this interrupter is shown as consisting of two metal disks 19, 20, rigidly connected, against which are pressing two contact springs 21 and 22, respectively. One part 23 of the circumference of the disk 20 is made out of non-conducting material. The conductor 18 aforementioned is connected to the spring 21, spring 22 being connected by a conductor 24 to the electric source 16. An interrupter 82, 83, functions of which are described farther on, is inserted between the spring 22 and electric source 16. The core 25 of the solenoid 17 is rigidly connected to a sliding rod 26, influenced by a coil spring 27 tending to keep it in raised position as shown in Fig. 2. The rod 26 is provided with a pin 28 entering into a slot 29 in one extremity of a bell-crank lever 30, pivoting at its angle, the other arm of which is connected by a link rod 31 to one of the bolts 32 of a hole-cutting or punching machine of the ordinary type. The bell-crank lever 30 is suitably influenced by a coil spring or the like 33 in the direction shown by an arrow on drawing. If the interrupter 19, 20, 21, 22 is placed in the position shown by fully drawn lines in Fig. 2, and the circuit comprising the solenoid 17 is closed by the corresponding relay 10, the solenoid 17 is excited and will attract its core 25 and the rod 26, thus forcing the lever 30 into the position shown by dotted lines in Fig. 2, which corresponds to an inactive position (also shown by dotted lines) of the corresponding bolt 32, said bolt then not influencing the corresponding punch 34, when the hammer or head 35 of the cutting-machine is forced down. Consequently, in such a case no hole will be cut in the card 36. Each one of the bolts 32 commanding a punch 34 is connected to regulating devices of the kind described.

As soon as any lever 30 be turned into the position shown by dotted lines in Fig. 2, a horizontal rod 37 running transversely underneath all members 30 will be depressed, said rod being connected to an interrupter inserted in the same circuit as a solenoid 38. In the present instance this interrupter is shown as a double-armed lever 39, one of its arms supporting the above rod 37, the other arm being sector-shaped and in contact with a conductor spring 40, another such spring 41 pressing against the nave 42 of the lever 39. One part 43 of the circumference of the sector is made out of non-conducting material, the conducting spring 40 thus being insulated from the other spring 41 if the lever 39 is placed as shown in Fig. 2. By a conductor 44 the spring 41 is connected to one pole of the electric source 16, the spring 40 being connected by a conductor 45 to one end of the windings of a solenoid 38, the other end of which windings is connected by a conductor 46 to the spring 21 of the interrupter 19, 20, 21, 22 aforementioned. In a suitable manner, for instance, by means of a connecting rod 48 the core 47 of the solenoid 38 is fixed to a member 49 supporting the guiding rods 51 of the punching head 35. If one or more of the levers 30 be turned into the position shown by dotted lines in Fig. 2 the interrupter 39, 40, 41 will close a circuit passing through the windings of the solenoid 38, the core 47 of which will draw the punching head 35 downward. This will influence an interrupter consisting of two arms 53, 54 with contacts 55, 56 inserted in the same circuit as the lamp 6. The arm 53, which is kept down by a coil spring 52 so as to rest on the upper end of the one of the guiding rods 51 or a member connected thereunto as long as the punching head remains in its uppermost position, then keeps the arm 54 uplifted and the contact 55, 56 closed, the lamp 6 then burning. The downward motion of the punching head 35 will however release the arm 53, that will release the arm 54, stops 59 and 60 being disposed so as to retain said arms, when unsupported by the punching head or member connected thereunto, in a position breaking the contact 55, 56. The lamp 6 then ceasing to illuminate the cells of selenium, the resistance of these will augment so as no longer to permit the passage of a current sufficiently strong to influence the relay 10, which will become inactive. At about the same time the interrupter 19, 20, 21, 22 is influenced in the following manner so as to break the circuit passing through the solenoids 17 and 38. To the conducting disks 19, 20 is rigidly joined an arm 61 protruding between two knobs 63 on a vertically sliding rod 62 rigidly connected to the plunging part 47 of the solenoid 38 and suitably guided.

The punching head being pulled sufficiently far downward through the influence of the solenoid last-mentioned, the rod 62 will also have descended so far as to turn, by means of the uppermost knob 63, the arm 61 and disk 20 into the position shown by dotted lines in Fig. 2. The conducting spring 22 will then press against the non-conducting part 23 of the circumference of said disk and consequently be insulated from the conducting spring 21, the current which has been passing till then through parts 22, 20, 19, 21 being thus interrupted. The solenoid 38 becoming inactive, the several members connected to its core 47 will be released and moved upward through the influence of coil springs 64 or corresponding members arranged in the way usual with this kind of machinery. The punching head 35 being raised and member 62 following, the lower one of knobs 63 will again turn the arm 61 so as to bring the disks 19, 20 back into their former position, thus reëstablishing the electric connection between the conductor springs 21 and 22.

The number of small squares $r$ forming one horizontal row of a square R (Fig. 1) having thus been reproduced by the punching machinery, the design has to be transported horizontally a distance corresponding to such a square R, which may be effected in different ways, Fig. 3 showing an instance of a suitable arrangement for that purpose.

A glass screen 1, provided with guiding rollers 66, is horizontally movable within a frame 65, latter being vertically adjustable. To the screen are fixed cords or the like 67, 68, one of which, 67, is led over a roller 69 on the frame and attached to a weight or the like 70, the other string 68 being led over two rollers 71, 72 on the frame 65 and attached to a sliding rack 73, guided by the frame. A double-acting stop catch or escapement 74, which may be influenced by an electromagnet 75 (also shown in Fig. 2) keeps the rack 73 in position. The windings of the electromagnet 75 are connected on one side by a conductor 76 to one pole of the electric source 16, on the other side by a conductor 77 to an interrupter which, according to Fig. 2, consists of a fixed part 78 and a movable one 79, the latter one being, when the punching head descends, actuated by a pin 80 on the rod 62 so as to come into contact with the member 78, thus closing the circuit exciting the electromagnet 75. Said electromagnet will then attract the nearest end of the catch 74, thus bringing its other end into gear, the rack being then, on account of the disposition of its teeth relatively to the escapement, able to advance, through the influence of the weight 70, half the distance from tooth to tooth, said distance being exactly the same as the horizontal measure of one square R of the design. The action of the solenoid 38 ceasing, the lever 79 will be released and replace itself in the position shown in Fig. 2, interrupting thereby the current of the electromagnet 75, latter releasing the catch 74 which, swinging back into its former position under the influence of a coil spring or the like 81, will then permit the rack 73 again to move half the distance from tooth to tooth. Each time the punching head is working the rack 73 will move the distance of one tooth, and screen 1 with the design will consequently advance to the left on the drawing so as to bring a new series of small squares $r$ exactly in front of the opening of the camera.

The screen having advanced so far, that the last series of squares R to the right on the drawing has been reproduced, it will, when continuing its motion, influence, either directly or by means of an adjustable member, the movable part 82 of an interrupter 82, 83, thus breaking the circuits passing through the conductor 24 (Fig. 2). As mentioned, the frame 65 is vertically movable between guide rollers 84 and adjustable by means of racks 85 sliding between guide rollers 86 and gearing with wheels 88 on a transverse axle 87, carrying at one extremity a ratchet wheel 89 kept in position by a pawl 90.

The above devices are used and work in the following manner. The screen 1 is adjusted so as to present the first row from beneath of squares $r$ within the first square R from the left on the design exactly in front of the opening of the camera 3. The interrupter 82, 83 is adjusted as shown in Fig. 3 in order to permit the electric circuits to be closed. Such cells of selenium as are influenced by rays of light passing through transparent squares $r$ of the design 2, will then permit the current from the electric source 13 to pass on to the corresponding relay 10, these closing the circuits of the solenoids 17 corresponding thereto. This will, in the manner described, cause the corresponding bolts 32 to be withdrawn from their punches, bolts corresponding to cells not illuminated being left in active position. As soon as one or more of the solenoids 17 have attracted their plunging members 25 a circuit passing through the solenoid 38 is closed, the plunging member 47 of the solenoid last mentioned is attracted causing the punching head to descend and to press down all bolts 32. Such of these as are in active position above their punches 34 will then cause holes to be punched in the card 36. This corresponds to the usual way of punching cards, holes being pierced for all squares colored on the textile design. One series of such squares, corresponding in number to one traverse row of jacquard needles, has then been reproduced on the card. When the member 47 is moving downward it causes the circuit passing through the electromagnet 75 to be closed by the contact 78, 79, the screen 1 and design 2 advancing at the same time the length of half a square R. By means of the interrupter 53, 54, 55, 56 the lamp 6 has been extinguished, the cells and relay 10 becoming consequently inactive, but the hammer 35 when descending keeps its hold of the inactive bolts 32 so as to prevent them from moving horizontally and thereby the interrupter 37, 39, 40, 41, 42 from breaking the circuit of the solenoid 38 before the punching be performed. Member 62 continuing to descend, the interrupter 19, 20, 21, 22 will however be turned and the circuits of solenoids 17 and 38 interrupted. The punching hammer 35 will then, member 47 being released, be lifted by its coil springs 64, releasing the bolts 32, the inactive ones of these returning to their active positions. Simultaneously the contact 78, 79 has been interrupted, the electromagnet 75 releasing the catch 74 so as to permit the screen with the design to advance another half of a square R, thus bringing a new series of small squares to be reproduced exactly in front of the opening of the camera. The punching head regaining its uppermost position, the contact 55, 56 is restored and the lamp 6 lighted, the interrupter 19, 20, 21, 22 being about the same time replaced as shown by fully drawn lines in Fig. 2. The mechanical parts of the cutting machine have at the same time advanced the card 36 one step in the usual manner. All parts of the apparatus being thus replaced in positions allowing the same series of operations to be repeated, the working of the device will continue automatically as described, till the whole width of the design 2 has been reproduced and the screen 1 arrived at its extreme position to the left, when it will cause the interrupter 82, 83 to break the circuits and stop the machinery. The card 36 when finished is removed and a new one put in its place. The screen 1 and frame 65 are readjusted for a new horizontal row of squares and the reproduction of the new jacquard card started by closing the contact 82, 83.

The above device may also be used for reproducing such designs as, without heeding the angles of the small squares $r$, are drawn on transparent paper with opaque color so as to present surfaces with curved outlines, the apparatus then executing, automatically, the same work as is usually done by a textile designer when rendering the curved outline by a series of rectangular gradations.

If the cells of selenium are made so as to permit a current of the required strength to pass as soon as a certain part, say one half, of a corresponding square $r$ or of the space on the design corresponding to such a square is transparent, the relay 10 being accordingly adjusted, it will evidently be irrelevant whether the rectangular lines on a square-ruled paper be followed or not when designing, the cells deciding automatically, whether a place on the design, corresponding in size to a small square $r$, the image of which place is projected on the cell in question, be sufficiently opaque to be reproduced by a hole in the jacquard card, or sufficiently transparent not to be reproduced.

Moreover, the present device may be used to reproduce textile designs of a more complicated nature, i. e. such executed in several colors. Such designs, serving as a rule to manufacture fabrics with a double or treble system of threads in one or both directions, cannot be made transparent being as a rule executed with opaque colors covering in places one another, which different colors are not destined to be reproduced all at the same time or on the same jacquard card. In such a case, the proceeding is as follows: A sufficiently strong light is thrown on the design to permit its reproduction, possibly enlarged, by photography, one or more colors being excluded from influencing the photographic film by means of using, in the well-known manner, one or more filters of color. By adapting the time of exposure, the degree of sensibility of the film and the chemical process of developing in the usual manner to the object in view, an image may be obtained corresponding as regards its opaque and transparent parts to the selection of colors desired. The design is, while being photographed, transported at successive intervals in the same way as already described regarding the successive projections through a partly transparent design. The photographic film being advanced correspondingly step by step, a series of images will be obtained, representing, as regards the relative positions of opaque and transparent parts, the same dispositions as the relative positions of uncut places and holes in the different rows of jacquard cards corresponding to the design in question. The film will however show an opaque surface corresponding to the place where the textile design is non-colored or shows a color, the rays reflected from which have passed through the filter used. Substituting such a film for the design 2 in the above description, the film being made to advance by suitable successive steps in front of the opening of the camera 3, the present device would consequently produce jacquard cards in which the holes cut would correspond to squares, some of them left white, and some of them painted with one or more colors on the original design. With certain designs and fabrics this may be desired for certain of the jacquard cards, whereas other cards may be desired to represent by holes certain colored parts of the design only. In order to obtain this it will be sufficient, when using the above apparatus, to arrange the relay 10 in such a manner as to interrupt, when actuated through the influence of cells of selenium which are illuminated, the circuit of the solenoids 17. Or a positive film may be taken from the negative one in the usual way, and used instead of the original design.

I claim:—

1. An apparatus for regulating automatically the cutting of the holes in jacquard cards according to various designs, comprising a camera, a source of light, a design having opaque and transparent parts and placed movably between said source of light and said camera, cells of selenium disposed in said camera and corresponding in number to the number of holes in a transverse row of a jacquard card, an electric connection between each cell and a relay placed in the circuit of an electromagnetic member arranged to actuate a corresponding bolt of a jacquard punching machine, a hammer in said machine, a movable part of an electromagnetic member connected with said hammer, an interrupter put in circuit with said electromagnetic member, and connections between said bolt and said movable part arranged to actuate said interrupter.

2. An apparatus for regulating automatically the cutting of the holes in jacquard cards according to various designs, comprising a camera, a source of light, a design having opaque and transparent parts and placed movably between said source of light and said camera, cells of selenium disposed in said camera and corresponding in number to the number of holes in a transverse row of a jacquard card, an electric connection between each cell and a relay placed in the circuit of an electromagnetic member arranged to actuate a corresponding bolt of a jacquard punching machine, a hammer in said machine, a movable part of an electromagnetic member connected with said hammer, and an interrupter put in circuit with said electromagnetic member.

3. An apparatus for regulating automatically the cutting of the holes in jacquard cards according to various designs comprising a camera, a source of light, a design having opaque and transparent parts and placed movably between said source of light and said camera, cells of selenium disposed in said camera and corresponding in number to the number of holes in a transverse row of a jacquard card, an electric connection between each cell, and a relay placed in the circuit of an electromagnetic member arranged to actuate a corresponding bolt of a jacquard punching machine, a hammer in said machine actuating said bolts, means for moving the said design, and means for controlling electrically said moving means in correspondence with the movements of said hammer.

4. An apparatus for regulating automatically the cutting of the holes in jacquard cards according to various designs, comprising a camera, a source of light, a design having opaque and transparent parts and placed movably between said source of light and said camera, cells of selenium disposed in said camera and corresponding in number to the number of holes in a transverse row of a jacquard card, an electric connection between each cell and a relay placed in the circuit of an electromagnetic member arranged to actuate a corresponding bolt of a jacquard punching machine, a hammer in said machine actuating said bolts, a screen supporting said design and movable horizontally and vertically, and means for controlling electrically said movements of the screen in correspondence with the movements of said hammer.

5. An apparatus for regulating automatically the cutting of the holes in jacquard cards according to various designs, comprising a camera, a source of light, a design having opaque and transparent parts and placed movably between said source of light and said camera, cells of selenium disposed in said camera and corresponding in number to the number of holes in a transverse row of a jacquard card, and a relay placed in the circuit of an electromagnetic member arranged to actuate a corresponding bolt of a jacquard punching machine, a hammer actuating the bolts of the punching machine, a movable part of an electromagnetic member actuating said hammer, a screen supporting said design and movable horizontally and vertically, means controlling electrically the movements of the screen, and an interrupter put in circuit with said controlling means and controlling the said hammer actuating part.

6. An apparatus for regulating automatically the cutting of the holes in jacquard cards according to various designs, comprising a camera, a source of light, a design having opaque and transparent parts and placed movably between said source of light and said camera, cells of selenium disposed in said camera and corresponding in number to the number of holes in a transverse row of a jacquard card, and a relay placed in the circuit of an electromagnetic member arranged to actuate a corresponding bolt of a jacquard punching machine, a hammer actuating the bolts of the punching machine, a movable part of an electromagnetic member actuating said hammer, a screen supporting said design and movable horizontally and vertically, and means for stopping the movement of the screen in horizontal direction.

7. An apparatus for regulating automatically the cutting of the holes in jacquard cards according to various designs, comprising a camera, a source of light, a design having opaque and transparent parts and placed movably between said source of light and said camera, cells of selenium disposed in said camera and corresponding in number to the number of holes in a transverse row of a jacquard card, and a relay placed in the circuit of an electromagnetic member arranged to actuate a corresponding bolt of a jacquard punching machine, a hammer actuating the bolts of the punching machine, a movable part of an electromagnetic member actuating said hammer, a screen supporting said design and movable horizontally and vertically, and an interrupter put in circuit with said electromagnetic members and arranged to be actuated by the screen in its limit position.

In testimony whereof I have signed my name.

ARVID GERHARD DAMM.